United States Patent [19]
Andrieu

[11] Patent Number: 5,584,021
[45] Date of Patent: Dec. 10, 1996

[54] BINARY OUTPUT SIGNAL PROGRAMMER USING STORED START AND END LOCATION AND TIMING SIGNAL STATES

[75] Inventor: Vianney Andrieu, Paris, France

[73] Assignee: Alcatel Radiotelephone, Paris, France

[21] Appl. No.: 141,883

[22] Filed: Oct. 27, 1993

[30] Foreign Application Priority Data

Oct. 29, 1992 [FR] France ................................ 92 12957

[51] Int. Cl.$^6$ ............................. G06F 12/00; G11C 7/00
[52] U.S. Cl. ......................... 395/555; 395/494; 365/233; 364/716
[58] Field of Search ..................................... 395/427, 431, 395/481, 494, 401, 550; 365/189.07, 233, 230.1; 364/716

[56] References Cited

FOREIGN PATENT DOCUMENTS

| 0187985 | 7/1986 | European Pat. Off. . |
| 0449190 | 10/1991 | European Pat. Off. . |
| 3417816 | 11/1985 | Germany . |

*Primary Examiner*—Glenn Gossage
*Attorney, Agent, or Firm*—Sughrue, Mion, Zinn, Macpeak & Seas

[57] ABSTRACT

A programmer produces binary output signals changing state during time intervals identified by a timing signal. Each output signal goes to the active or the inactive state, i.e. starts and ends during separate time intervals. The programmer includes a memory storing a start location and an end location for each output signal, respectively, holding the signal's start and end time intervals. The operation of a read unit for reading the values in these locations is determined by a control unit using an address generator so that the possibility of a change of state is examined for each output signal during each time interval. A comparator produces an identity signal if a first field of the read location has the same value as a first field of the time interval in which the reading takes place. A decoder changes the state of the output signal corresponding to the location for which the identity signal is produced. The control unit includes an indexing arrangement for representing the state of the output signal being examined in order to bring about reading of the start location of the output signal if it is inactive or of the end location of the output signal if it is active.

10 Claims, 2 Drawing Sheets

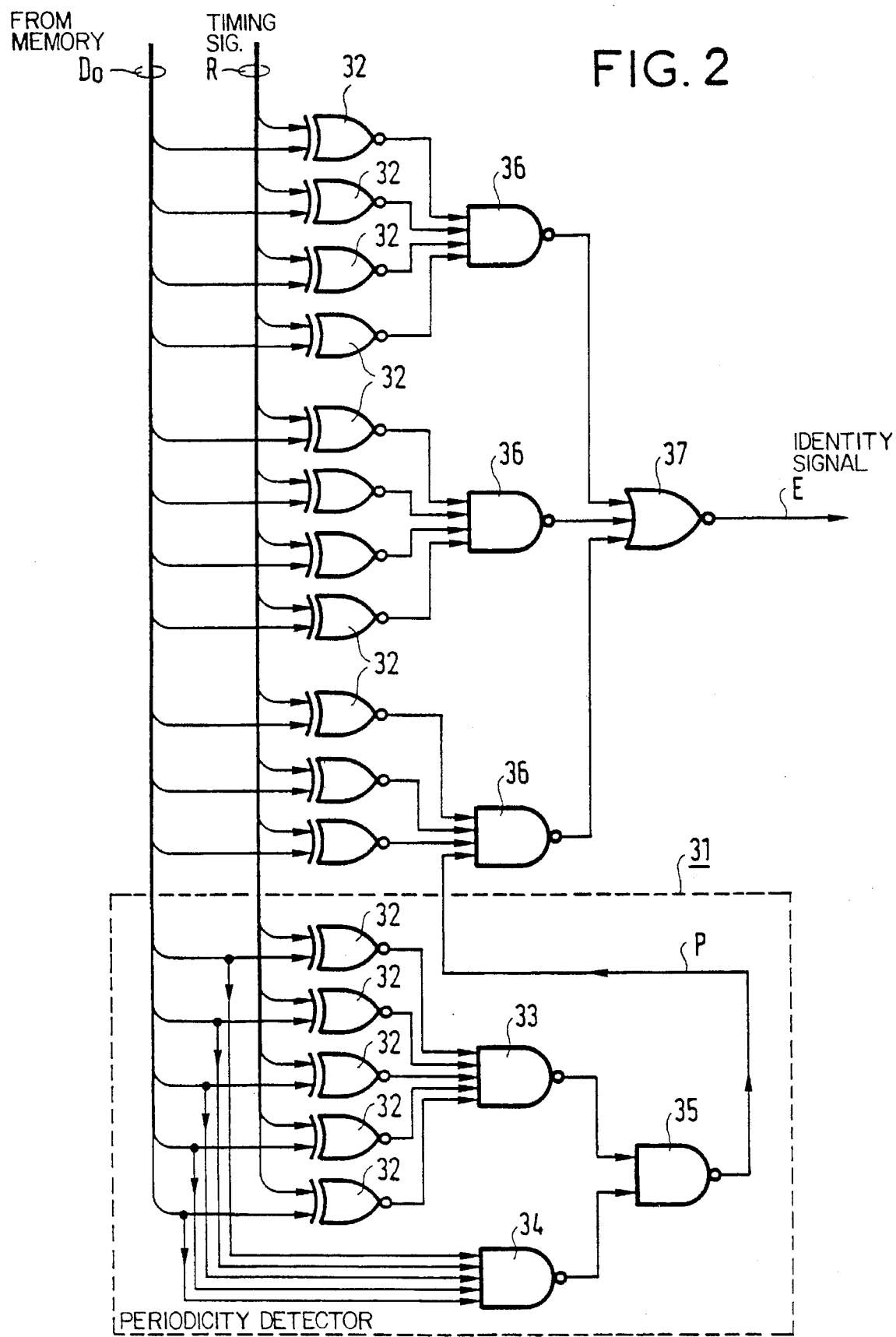

BINARY OUTPUT SIGNAL PROGRAMMER USING STORED START AND END LOCATION AND TIMING SIGNAL STATES

BACKGROUND OF THE INVENTION

1. Field of the Invention

The invention concerns a binary output signal programmer.

2. Description of the prior art

Programmers are devices whose output signals control the operation of various equipment in a predefined sequence. This sequence is usually stored in the programmer itself and progress through the sequence is controlled by an external timing signal.

Prior art solutions to providing programmers producing a small number of output signals are summarized in the application EP 0 449 190, hereby incorporated by way of reference. This earlier application also proposes a solution that is well suited to larger numbers of output signals. The programmer produces g binary output signals in response to a timing signal identifying time intervals of duration T, each output signal starting and ending during separate time intervals. It comprises a memory having a start location assigned an address and an end location assigned an address for each output signal, read means for reading numerical values in these memory locations, control means determining the operation of the read means using an address generator so that all the memory locations are read during each time interval, comparator means producing an identity signal if a first field of a start or end location has the same value as a first field of the time interval, as indicated by a timing signal, in which the reading takes place, and decoder means producing or interrupting the output signal corresponding to the location for which the identity signal is produced according to whether that location is respectively a start location or an end location.

This means that during the time period T it is necessary to examine 2q situations, that is two situations for each output signal. The processing time available for each situation is thus t=T/2q. This processing time t cannot be made arbitrarily small. The processing time is limited by the technology of the programmer. Additionally, the implementation cost is directly proportional to the speed of the technology and the power consumption is also related to the required speed of operation.

It is therefore necessary to assume that for a given application, the processing time is a given. The result is that the number g of output signals and the duration T of a time interval cannot be set independently. It is then possible to define a performance factor which represents the performance of the programmer and which has the value q/T. In other words, it is the number of output signals that can be processed during time T.

An object of the present invention is to provide a binary output signal programmer having an enhanced performance factor so that a larger number of output signals can be processed for a given fixed duration T or so that the same number of output signals can be processed during a shorter time. That is to say the present invention provides improved temporal precision.

SUMMARY OF THE INVENTION

The present invention is directed to a programmer producing binary output signals changing state during time intervals indicated by a timing signal. Each output signal goes to the active or inactive state, i.e. starting and ending during separate time intervals. The programmer comprises a memory having a start location, holding the start time interval of the output signal and an end location holding the end time interval of the output signal, read means for reading the values in the locations, control means for determining the operation of the read means so that the possibility of a change of state is examined for each output signal during each time interval. The programmer further comprises comparator means producing an identity signal if a first field of the location read has the same value as a first field of the time interval, as indicated by a timing signal, in which the reading takes place, and decoder means changing the state of the output signal corresponding to the location for which the identity signal is produced. The control means comprise indexing means for representing the state of the output signal being examined in order to bring about reading of the start location of the output signal if the output signal is inactive or its end location if the output signal is active.

As a result, the number of situations to be examined is halved, or in other words, the performance factor is doubled, with the following results:

- the number of output signals can be doubled with the same fixed duration of the time intervals, or
- the duration of the time intervals can be halved with the same fixed number of output signals, or
- power consumption can be significantly reduced by retaining the fixed time interval duration and the fixed number of output signals, the power consumption of a memory in read mode being proportional to the frequency or read operations.

The locations of the memory are advantageously each assigned an address having an identification area and a status bit. The identification areas of the start and end locations of an output signal are assigned the same value. The status bits of the locations are respectively assigned values corresponding to the inactive state and the active state of the the output signal. The control means comprises an address generator which delivers, during each time interval for each output signal, an address whose identification area corresponds to the signal and whose status bit supplied by the indexing means is the status of the signal, the reading means reading successively the values contained in the locations associated with the each of the addresses.

This is a particularly simple embodiment.

The comparator means produces the identity signal if a second field of this location additionally has a predetermined value called the periodicity value.

The timing signal comes from a first counter 44.

In one embodiment of the programmer, the memory is a random access memory and the programmer further comprises writing means for writing numerical values into the memory and the control means produces a control signal adapted to control either the writing means or the reading means.

According to a further feature of the programmer, the control means further comprises an address selector selecting for output to the memory either the address indicated by the address generator or a write address depending on whether the control signal is respectively controlling the reading means or the writing means.

To this end the control means receives a clock signal and the address generator includes a second counter receiving this clock signal and producing as an identification area a first field having the value indicated by the second counter.

The control means may determine the value of the control signal depending on the value of a second field of the second counter.

The frequency of the clock signal and the capacity of the second counter are chosen so that the second counter can perform a complete cycle during each time interval.

The programmer is further characterized in that the decoder means comprises an enabling register delivering an output signal only if enabling information specific to the output signal is present.

The various objects and features of the invention will emerge in more detail from the following description of embodiments of the invention given with reference to the appended figures.

BRIEF DESCRIPTION OF THE DRAWINGS

FIG. 2 is a block diagram of comparator of the programmer.

DETAILED DESCRIPTION OF THE INVENTION

Figure 1:
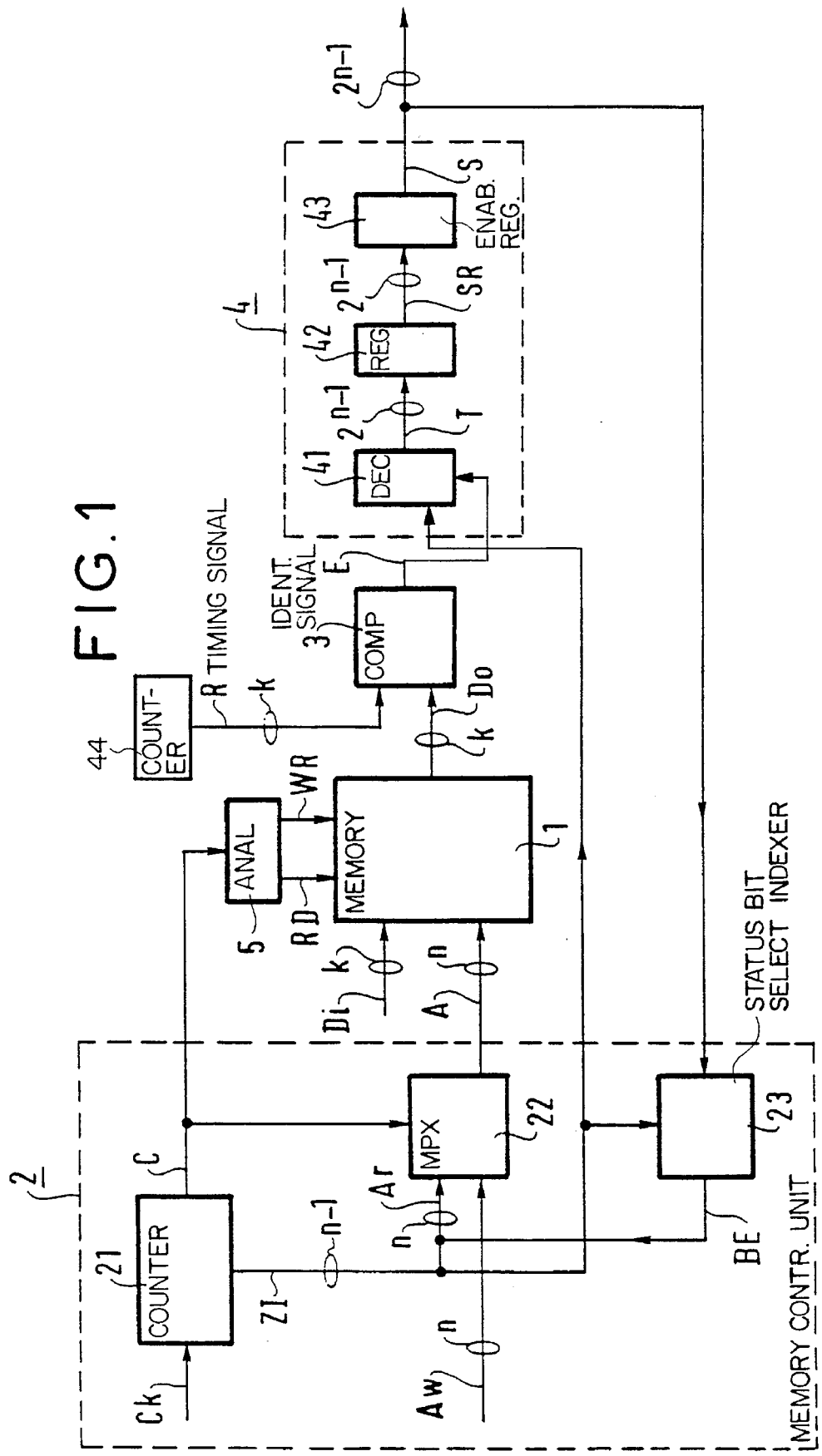
FIG. 1 is a block diagram of a binary output signal programmer in accordance with the invention.

Any identical items present in both figures are identified by the same reference number.

The programmer in accordance with the invention shown in FIG. 1 is designed to receive a digital timing signal R which identifies time intervals by means of a predetermined convention. It produces two-state output signals S.

The programmer essentially comprises a memory 1 storing information relating to the various output signals, a memory control unit 2, a comparator 3 for detecting identity between information from the memory and a time interval, and a decoder 4 for producing or interrupting an output signal S if the comparator produces an identity signal, discussed in more detail below.

The memory 1 is of any type. It may be a read-only memory (ROM) or a programmable read-only memory (PROM). In this embodiment it is a random access memory (RAM). It is therefore designed to receive a read signal RD setting it to read mode and a write signal WR setting it to write mode. These two signals are produced by an analyzer 5 which receives a control signal C to be described in detail later.

The locations of the memory are each identified by an address. In this example the number of addresses is fixed at $2^n$. Each location is designed to contain a digital value of k bits. The memory is adapted to receive an address signal A on n lines and input data Di on k lines and to produce output data Do on k lines.

In read mode the memory produces by way of output data Do the digital value stored at the location identified by the address signal A. In write mode it writes the input data Di into this location.

Two locations are associated with each output signal, the first corresponding to the start location of an output signal and the second to the end location of an output signal. It is assumed hereinafter that all locations of the memory are associated with one output signal. This assumption is adopted to clarify the explanation of the invention but must not be regarded as restricting the invention which remains equally applicable if this assumption does not hold true.

The timing signal R identifies the successive time intervals each of which can trigger a change of state of one of the output signals if it has the same value as the content of one of the two locations associated with that signal.

However, for a given output signal it is not necessary to examine both locations of the memory 1 associated with it. If the signal is active there is no point in reading the respective start location as only the end of the signal can occur. Conversely, if the signal is inactive there is no point in reading the respective end location because only the start of the signal can occur. Thus for each output signal it is sufficient to consult its start location if it is inactive or its end location if it is active, during each time interval, using indexing means responsive to the state of the signal.

In one specific embodiment of the invention the start location of a signal is associated with an even address and the end location of the signal is associated with the immediately next following odd address.

It follows that the two locations have a common identification area ZI comprising the (n−1) most significant bits of the respective addresses, the indentification area being used to associate a given pair of start and end locations with a particular output signal. The least significant bit or status bit BE of these addresses supplied by the indexing means indicates whether this is a start or end location according to whether its value is respectively 0 or 1. The next output signal is associated with the next two locations by application of the same principle, and so on.

To this end, the control unit 2 for the memory 1 includes an address generator which produces a read address signal Ar of n bits. This generator has a first element 21 for producing the identification area ZI of the address and the indexing means which in this example is in the form of a second element 23 for producing the status bit BE of this address. The first element 21 of the generator is advantageously a counter incremented by a clock signal Ck. The second element 23 of the generator selects as status bit BE that of the output signals corresponding to the identification area produced by the first element 21. If this signal is inactive, that is to say if its value is 0, the start location is addressed. If it is active, that is to say if its value is 1, the end location is addressed. The operation of the address generator will emerge more clearly later when all of the component parts of the programmer have been described.

The control unit 2 is also designed to enable writing of digital values into the memory during each time interval. To this end the capacity of the counter is greater than the number of addresses.

The capacity of the counter may be set at $2^n+2^{n-1}$, for example so that the counter has an output of (n+1) bits. The most significant bit, in other words the bit identifying values of $2^n$ or greater, is used to produce the control signal C which at 1 or 0 respectively defines the write or read mode. The memory control unit 2 further comprises a multiplexer 22 which produces the address signal A whose value is equal to the read address signal Ar or to a write address signal Aw received by the programmer depending on whether the control signal C has the value 0 or 1, respectively.

During a complete cycle of the counter 21 the locations of half the memory 1 area accessed in read mode using their address which is determined by a first field of this counter comprising al bits excluding the most significant bit C and the least significant bit BE. If the most significant bit C corresponding to a second field is 1, the input data Di is then written into the location identified by the write address signal Aw. The first and second fields which are respectively used to determine the read address and to command writing are here separate. It goes without saying that these fields may have a common part and can even be one and the same. If the clock signal Ck is periodic and has a frequency $f_1$ such that the cycle of the counter is executed exactly during a time interval, two thirds of the time interval are used to read and the remaining third is used to write.

The control unit 2 of the memory 1 described above is described by way of example and the invention does not exclude other embodiments of it. In particular, the means for writing during a time interval are not strictly necessary to the functioning of the invention, especially if the memory is a read-only memory. It is also possible to provide other means of writing digital values into the memory either during the time intervals or during a period in which the programmer is not exercising its function of controlling the output signal S.

The programmer further comprises a comparator 3 which receives a timing signal R of k bits and the output data Do from the memory also of k bits. In a first form the comparator produces an identity signal E when the time interval and the output data are identical, and in this case constitutes a simple identity comparator. The values to be compared may be subdivided into fields, and in this case the examination fields comprise all these values. In a more elaborate form shown in FIG. 2 the comparator produces the identity signal in the event of partial identity of the output data Do and the time interval. In other words the identity signal is produced on identity of one field of these values. In the example shown, k=16. The output data and the time interval each comprise a first field of 11 less significant bits (at the top of the figure) and a second field of five more significant bits (at the bottom of the figure). In this case the identify signal is produced if the first fields are identical and if a periodicity signal P is present. This periodicity signal is produced by a periodicity detector 31 if the second fields are identical or if the second field of the output data has a particular value called the periodicity value. The periodicity detector comprises five "EXCLUSIVE NOR" gates 32 each receiving one bit of the second field of the output data and of the timing signal R indicating a time interval and therefore producing a "1" in case of identity. The outputs of these five gates are fed to the inputs of a first "NAND" gate 33 which therefore produces a "0" if the second fields are identical. The periodicity detector further comprises a second "NAND" gate 34 which produces a "0" if and only if the five bits of the second field of the output data are at "1", in other words if the periodicity value comprises five bits at "1". The periodicity signal P is produced by a third "NAND" gate 35 having inputs connected to the outputs of the other two "NAND" gates 33,34.

The first fields of the output data and the time interval are compared in similar manner, the bits of each field being compared one by one by means of "EXCLUSIVE NOR" gates 32. Three "NAND" gates 36 each receive some of the outputs of the preceding gates. One of these "NAND" gates also receives the periodicity signal P. If and only if the first fields are identical and the periodicity signal P is present are the outputs of the three "NAND" gates 36 at "0". A "NOR" gate 37 produces the identify signal E according to these three outputs.

The timing signal is advantageously obtained from a counter, although this is not essential for the invention. In this case, the counter is incremented by a timing clock and triggers production of the identity signal E for each memory location whose second field is assigned the periodicity value with a repetition period corresponding to $2^{11}$ pulses of the timing clock operating at frequency $f_2$. One advantageous solution is for $f_2$ to be made equal to the frequency $f_1$ of the counter 21 of the control unit 2 divided by the capacity of this counter.

The comparator 3 described above and, in particular the means for producing an identity signal repetitively using the periodicity value, are described by way of example and must not be interpreted as restricting the invention.

The decoder 4 constituting the last component of the programmer will now be described with reference to FIG. 1. It comprises a decoder 41 which is known to [the man] one skilled in the art as an n to $2^n$ decoder. In the present example the decoder inputs receive the (n −1) bits of the identification are ZI. The decoder has $2^{n-1}$ outputs corresponding to all possible values of the identification area. On receiving the identity signal [it] the decoder produces a signal T for switching to the output identified by the current value of the identification area ZI. The decoder 41 is followed by a first register 42 which [the man] one skilled in the art [usually] often calls a JK flip flop or register. In this example this first register 42 has $2^{n-1}$ inputs each connected to one output of the decoder 41 and 2n−1 outputs associated with its inputs. The register produces at its output, for an output signal identified by the current value of the identification area ZI, an activation signal SR which changes state each time a switching signal T is received on the corresponding input.

In an optional embodiment a second register 43 has 2n−1 enabling bits (not shown in the figures) each associated with one output S and receives the activation signals SR. The second register 43 reproduces as output signal S identified by the current value of the identification area the corresponding activation signal SR if the corresponding enabling bit is set at "1".

The second register 43 is advantageously used to enable individually each output signal and is therefore called the enabling register.

By way of example, when the memory 1 is powered up, the digital values it contains are indeterminate. It is therefore prudent to enable an output signal only if it has actually been written into the memory.

The programmer as described above uses a memory of $2^n$ words x k bits to control $2^{n-1}$ output signals S in a sequence having $2^k$ steps. The programmer also enables some of these signals to be controlled periodically during the same sequence.

The indexing means 23 of this example is in the form of the device known to one skilled in the art as a $2^n$ to 1 encoder or multiplexer. It receives all the output signals S and produces as status bit BE the output signal identified by the current value of the identification area ZI, switching the memory 1 to the start location corresponding to this output signal if it is inactive in other words if its value is 0, or to the end location otherwise.

There is claim:

1. A programmer for producing binary output signals changing state during time intervals indicated by a timing signal, each output signal going to a starting active or an ending inactive state, the starting and ending states occurring during separate time intervals, said programmer comprising a memory having a start location storing a start time interval of each output signal and an end location storing an end time interval of each output signal, read means for reading the values stored in the start and end locations, control means for determining the operation of said read means so that the possibility of a change of state is examined for each output signal during each time interval, comparator means for producing an identity signal if a first field of the location read from said memory has the same value as a first field of the time interval, as indicated by the timing signals, in which the reading takes place, and decoder means for changing the state of the output signal corresponding to the location for which the identity signal is produced, wherein said control means comprises indexing means for representing the state of the output signal being examined in order to bring about reading of the start location of that output signal if that output signal is inactive or of the end location if that output signal is active.

2. A programmer according to claim 1, wherein said decoder means includes an enabling register for enabling each of said binary output signals only if enabling information corresponding to a respective output signal is set.

3. A programmer according to claim 1, wherein the locations of said memory are each assigned an address comprising an identification area and a status bit, the identification areas of the start and end locations of an output signal being assigned the same value and the status bits of the start and end locations being respectively assigned values corresponding to the inactive state and the active state of that output signal, said control means further comprises an address generator which outputs during each time interval for each output signal an address whose identification area corresponds to that output signal and whose status bit supplied by said indexing means is the status of that output signal, and said reading means reads successively the values contained in the locations associated with each of said addresses.

4. A programmer according to claim 3, wherein said comparator means produces said identity signal when a second field of the location read from memory has a particular periodicity value.

5. A programmer according to claim 3, wherein said timing signal is produced by a counter.

6. A programmer according to claim 3, further comprising writing means for writing values into said memory and wherein said memory is a random access memory and said control means produces a control signal for selectively controlling said writing means and said reading means.

7. A programmer according to claim 6, wherein said control means further comprises an address selector for selecting for output to said memory either an input read address output by said address generator or a write address depending on whether said control signal is respectively controlling said reading means or said writing means.

8. A programmer according to claim 7, wherein, said control means receives a clock signal and said address generator comprises a counter receiving said clock signal and outputting as an identification area a first field having the value indicated by said counter.

9. A programmer according to claim 8, wherein said control means determines the value of said control signal according to the value of a second field output by said counter.

10. A programmer according to claim 9, wherein the frequency of said clock signal and the capacity of said counter are such that said counter can execute a complete cycle during each of said time intervals.

* * * * *